United States Patent [19]

DeCraene

[11] 4,224,119
[45] Sep. 23, 1980

[54] IN-CELL MANGANESE ORE REDUCTION

[75] Inventor: Denis F. DeCraene, Elkridge, Md.

[73] Assignee: Chemetals Corporation, Baltimore, Md.

[21] Appl. No.: 65,503

[22] Filed: Aug. 10, 1979

[51] Int. Cl.² ............................................. C25C 3/00
[52] U.S. Cl. ................................................. 204/64 R
[58] Field of Search ..................................... 204/64 R

[56] References Cited

U.S. PATENT DOCUMENTS

| 704,393 | 7/1902 | Simon | 204/64 R |
|---|---|---|---|
| 3,018,233 | 1/1962 | Welsh et al. | 204/64 R |
| 4,010,236 | 3/1977 | Welsh | 204/64 R |

Primary Examiner—Howard S. Williams
Attorney, Agent, or Firm—Keil & Witherspoon

[57] ABSTRACT

A process for reducing manganese (IV) dioxide to manganese (II) oxide, and then reducing the manganese (II) oxide to manganese metal, by pelletizing a blend of crushed manganese ore containing manganese (IV) dioxide and a solid carbonaceous fuel, heating the pellets to reduce manganese (IV) to manganese (II) oxide, and reducing the manganese (II) to manganese metal by electrolysis in a fused salt electrolytic bath.

10 Claims, 1 Drawing Figure

IN-CELL REDUCTION PROCESS

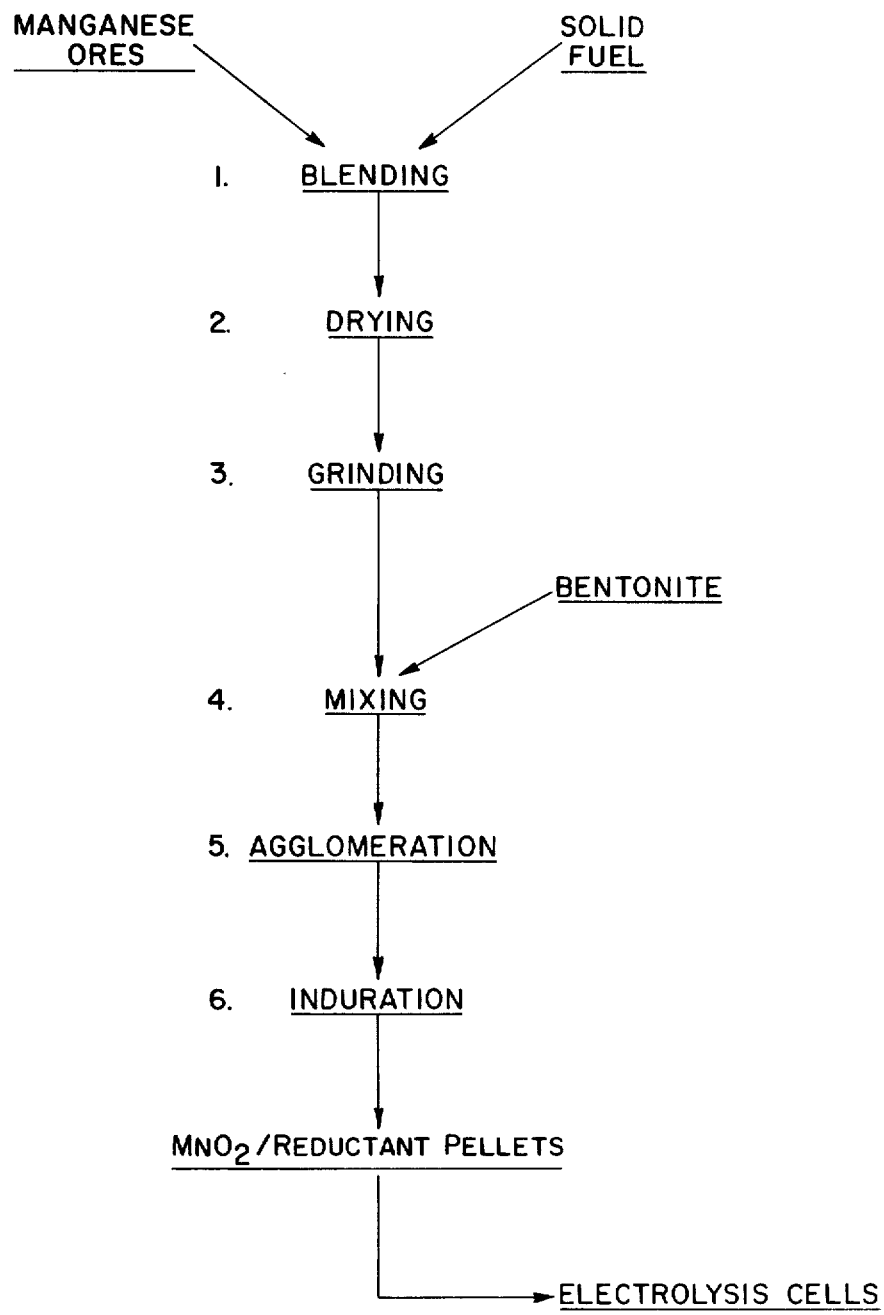
IN-CELL REDUCTION PROCESS

IN-CELL MANGANESE ORE REDUCTION

FIELD OF THE INVENTION

This invention relates to an improved process for producing manganese metal by employing the heat content of a fused salt medium to reduce higher manganese oxides contained in manganese ore to lower manganese oxides using a pelletized blend of crushed manganese ore and a solid carbonaceous fuel which is heated by a fused salt electrolytic bath.

BACKGROUND OF THE INVENTION

Manganese metal may be produced by electrolysis in a fused salt electrolytic bath. A fused salt electrolytic bath for the production of manganese is described in U.S. Pat. No. 3,018,233 by J. Y. Welsh, M. W. Milberg and H. R. Peterson, the disclosure of which is incorporated herein by reference. Such a fused salt electrolytic bath contains a mixture of oxides and also contains a fluoride. The fluoride, preferably calcium fluoride, is necessary in order to provide sufficient electrical conductivity and fluidity to the fused electrolyte. It is preferred that the bath contain at least 50% by weight of a fluoride; but it is possible to operate a fused salt electrolytic bath with an electrolyte containing less than 50% by weight of fluoride. The mixture of oxides in the fused salt electrolytic bath may include $B_2O_3$, $Al_2O_3$, $TiO_2$, $SiO_2$, $CaO$, $K_2O$, $Na_2O$, $BaO$, $MnO$, or a combination of these or other similar oxides. The composition of the electrodes and the electrical operation of the electrolytic cell are fully described in the U.S. Pat. No. 3,018,233.

The fused salt electrolytic process described in U.S. Pat. No. 3,018,233 reduces a lower oxide of manganese such as manganese (II) oxide to manganese metal. The present invention provides an improved process for reducing higher manganese oxides, such as manganese (IV) dioxide, contained in a manganese ore to manganese metal via manganese (II) oxide, using a pelletized blend of crushed manganese ore and a solid carbonaceous fuel heated by a fused salt electrolytic bath.

SUMMARY OF THE INVENTION

An improved process has been discovered for producing manganese metal from manganese ore by means of a fused salt electrolytic process. In the present invention, a pelletized blend of crushed manganese ore and solid carbonaceous fuel is heated in a fused salt electrolytic bath for the production of manganese metal. The heat contained in the fused salt electrolytic bath effects reduction of the manganese ore with carbon contained in the solid carbonaceous fuel to produce manganese (II) oxide.

The MnO produced by the reduction of the manganese ore is useful for the production of manganese metal by the electrolytic process described in U.S. Pat. No. 3,018,233, the disclosure of which is incorporated hereby by reference. In this electrolytic process, the MnO produced by heating the pelletized blend of crushed manganese ore and solid carbonaceous fuel is dissolved in the molten electrolytic bath which is in contact with the surface of a pool of molten manganese. An electric current is passed from a carbon anode partially immersed in the molten electrolytic bath, through the electrolytic bath, to the surface of the pool of molten manganese which acts as a cathode. The electric current effects reduction of the manganese (II) oxide to manganese metal.

The present invention encompasses the production of the pelletized blend of crushed manganese ore and a solid carbonaceous fuel, the process for reducing manganese (IV) dioxide to manganese (II) oxide by heating this pelletized blend of crushed manganese ore and a solid carbonaceous fuel, and the process of preparing manganese metal in a fused salt electrolytic bath using manganese (II) oxide formed from the pelletized blend of crushed manganese ore and a solid carbonaceous fuel.

It is an advantage of the present invention that it provides an efficient method of using the heat content in a fused salt electrolytic bath to effect reduction of manganese (IV) dioxide to manganese (II) oxide.

It is a further advantage of the present invention that it provides a process for reducing manganese (IV) dioxide to manganese (II) oxide in which the ratio of manganese ore to the solid carbonaceous reducing agent is predetermined and constant, thereby obviating the need to maintain control of the ratio during the reduction process.

It is another advantage of the present invention that the process for reducing manganese (IV) dioxide to manganese (II) oxide is particularly efficient because of the high surface area and intimate contact between the crushed manganese ore and solid carbonaceous fuel which acts as a reducing agent in the pelletized blend.

Still other advantages of the invention will be readily apparent to those of ordinary skill in the art from the FIGURE and detailed description of the invention which follow.

BRIEF DESCRIPTION OF THE DRAWING

The FIGURE is a flow diagram illustrating an in-cell manganese ore reduction process according to the present invention.

While the invention will be described in connection with preferred procedures, it will be understood that it is not intended to limit the invention to those procedures. On the contrary, it is intended that the present invention encompass all alternatives, modifications and equivalents as may be included within the spirit and scope of the invention as defined by the claims.

DETAILED DESCRIPTION OF THE INVENTION

In the present invention, a pelletized blend of crushed manganese ore and solid carbonaceous fuel is heated in a fused salt electrolytic bath for the production of manganese metal.

The pelletized blend of crushed manganese ore and solid carbonaceous fuel is formed by the process illustrated in the FIGURE. The manganese ore used is primarily in the form of $MnO_2$. Manganese ore may contain, for example, about 50 to about 55% by weight of manganese. The solid carbonaceous fuel may be selected from materials such as coke, coal, charcoal, carbon, and wood chips. Of these, coke and coal are preferred carbonaceous fuels.

In the first step of the pellet making process, manganese ore is mixed or blended with sufficient carbonaceous fuel to reduce the $MnO_2$ contained in the ore to MnO. The ratio of manganese ore to carbonaceous fuel can be varied from about 8 to 1 up to about 18 to 1. At ratios below about 8 to 1, the pellets subsequently produced are too soft and susceptible to disintegration in subsequent handling. Disintegration of the pellets is undesirable inter alia because of dusting and excessive losses when the pellets are used to feed an electrolytic cell for the production of manganese metal. At ratios above about 18 to 1, there will be insufficient solid fuel to effect the complete reduction of $MnO_2$ in the ore. It is preferred that the ratio of manganese ore to carbonaceous fuel be between about 10 to 1 and about 13 to 1. It is especially preferred that the ratio be about 11 to 1.

In the second step of the pellet making process, the blended manganese ore and carbonaceous fuel are dried to remove free moisture. The temperature of the drying step is kept sufficiently low to prevent ignition of any dust from the solid fuel. Typically, the blended ore and fuel are dried at a temperature of about 100° C.

In the third step of the pellet making process, the blended and dried manganese ore and carbonaceous fuel are ground, for example in a mill, to a particle size which will produce a pellet having good physical properties. The size of the grind may vary from about $-30$ mesh$\times$D to about $-100$ mesh$\times$D. Grinding the blended and dried ore and fuel to a particle size of about $-60$ mesh$\times$D is generally preferred. If the grind is too coarse, the agglomeration step (which follows) will produce a pellet having poor physical properties due to its low density. Conversely, if the grind is too fine, the agglomeration step will produce a pellet having serious dusting problems. For these reasons, sizing the grind from about $-30$ mesh$\times$D to about $-100$ mesh$\times$D is preferred. The symbol "mesh$\times$D" refers to mesh sizes by Down.

In the fourth step of the pellet making process, the ground, dried blend of ore and fuel is mixed with a clay-type binder, for example bentonite, to strengthen the pellets produced in the following agglomeration step. The amount of clay-type binder mixed with the blend may vary from about 0.25% up to about 4% by weight. Generally, mixing about 1% to about 3% by weight of a clay-type binder with the ground, dried blend is preferred. It is desirable to strengthen the pellets produced in the following agglomeration step so that they may be subjected to subsequent processing and handling without physical disintegration.

In the fifth step of the pellet making process, the ground, dried blend of ore and fuel, mixed with a clay-type binder, is compacted or agglomerated to form pellets, for example in a balling dish. Other means for compacting the blend mixed with clay-type binder may also be used, for example pelletizing or briqueting presses. Typically, the pellets thus produced are between about 0.25 and about 0.5 inches in diameter. A liquid binder may be added during the compacting to facilitate agglomeration. Suitable liquid binders include sodium silicate solution and aqueous molasses solution, as well as other liquid binders which will be readily apparent to those in the field of agglomeration. It is generally preferred to add about 1% by weight of a liquid binder to the ground, dried blend mixed with a clay-type binder, although from about 0.5% to about 5% by weight of a liquid binder may be usefully added to facilitate agglomeration.

In the sixth and last step of the pellet making process, pellets formed by the compacted blend of ore and fuel mixed with binders are hardened or indurated by heat treatment at a temperature between about 200° F. to about 350° F. for a period of about 10 to about 60 minutes. In general, heating at a temperature of at least about 325° F. for a period of at least about 40 minutes is sufficient to harden the pellets so that the pellets can withstand subsequent handling without physical disintegration.

Hardened pellets made by the above-described process may be stored in storage bins until needed for use in the production of manganese metal by electrolysis in a fused salt electrolytic bath. A suitable fused electrolytic bath for the production of manganese is described in U.S. Pat. No. 3,018,233 by J. Y. Welsh, M. W. Milberg and H. R. Peterson, the disclosure of which is incorporated herein by reference. As described therein, it is a feature of the operation of the electrolytic cell that the heat balance of the cell must be such that the molten electrolytic bath is in contact with the surface of a molten pool of manganese metal, which is the product of cell's operation.

The present invention uses heat contained in the molten electrolyte bath to effect the reduction of manganese ore by carbon as represented by the following equations:

$$2MnO_2 \rightarrow Mn_2O_3 + 1/2O_2 \qquad (1)$$

$$C + 1/2O_2 \rightarrow CO \qquad (2)$$

$$Mn_2O_3 + CO \rightarrow 2MnO + CO_2 \qquad (3)$$

$$Mn_2O_3 + H_2 \rightarrow 2MnO + H_2O \qquad (4)$$

The first equation represents the partial thermal reduction of $MnO_2$ contained in the pelletized crushed manganese ore to $Mn_2O_3$. This reaction requires a substantial temperature, at least about 800° K. or 527° C. Furthermore, since this reaction is endothermic, the molten electrolytic bath must supply sufficient additional heat to maintain the reaction. The oxygen released from the above reaction then reacts with carbon in the pelletized blend of crushed manganese ore and solid carbonaceous fuel to produce carbon monoxide gas. The carbon monoxide gas produced in the interior of the pellet reacts with $Mn_2O_3$ as indicated in the third equation to produce MnO and $CO_2$. The fourth equation is applicable only if the solid carbonaceous fuel used in the pelletized blend is coal, which contains residual volatile hydrocarbons. When exposed to the intense heat of the molten electrolyte bath, these hydrocarbons generate hydrogen as well as carbon monoxide. If hydrogen is present in the interior of the pellet, it reacts with $Mn_2O_3$, as indicated in the fourth equation, to produce MnO and $H_2O$. These reactions are discussed in more detail in U.S. Pat. No. 4,010,236 by J. Y. Welsh, the disclosure of which is incorporated herein by reference.

The MnO produced by the reduction of manganese ore as set forth in the above equations is useful as a starting material for the production of manganese metal by the electrolytic process described in U.S. Pat. No. 3,018,233. In this process, a lower oxide of manganese, such as MnO, is dissolved in a molten electrolytic bath (as previously discussed) which is supported by a pool of molten manganese. An electric current is passed from a carbon anode partially immersed in the molten electrolytic bath, through the electrolyte bath containing dissolved MnO to the surface of the pool of molten manganese (which acts as a cathode) to reduce the manganese oxide according to the equation:

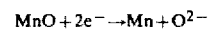

$$MnO + 2e^- \rightarrow Mn + O^{2-}$$

Periodically the molten manganese produced is tapped from the pool. The product manganese metal, as tapped from the electrolytic cell, generally assays over 91.0% Mn.

The pelletized blend of crushed manganese ore and solid carbonaceous fuel ore made by the process of the FIGURE are fed to the electrolytic cell to form layers on the surface of the molten electrolytic bath. As the heat from the molten bath warms the nearest pellets, they undergo the reduction reactions discussed above. When the pellets reach the temperature of the molten bath, they melt and dissolve in the bath. Successively, the next layer of pellets containing $MnO_2$ moves down toward the surface of the molten electrolytic bath, is warmed and reduced to form MnO, dissolves in the bath, and is electrolyzed as discussed above to form manganese metal.

The invention will now be illustrated with the following specific examples, which should not be considered as limiting in any way:

EXAMPLE NO. 1

Ore: Australian Ore; 52% Mn, typical
Solid Fuel: Pennsylvania Rice Coal
Ore:Fuel Ratio: 10:1
Grind: −60 mesh
Binder System: 2% (Bentonite/20% Sodium Silicate) solution
Table of Results: 84,581 pounds total

| Avg. Daily Feed, Lbs. | Avg. Cell Volt. | No. of Days | % Mn Eff. | Metal Analysis | | |
|---|---|---|---|---|---|---|
| | | | | % Mn | % Si | % C |
| 7,050 | 8.2V | 12 | 98.9 | 91.6 | 0.43 | 0.18 |

EXAMPLE NO. 2

Ore: Australian Ore; 52% Mn, typical
Solid Fuel: Pennsylvania Pea Coke
Ore:Fuel Ratio: 10:1
Grind: −60 mesh
Binder System: 1% (Bentonite/50% Molasses) solution
Table of Results: 37,756 pounds total

| Avg. Daily Feed, Lbs. | Avg. Cell Volt. | No. of Days | % Mn Eff. | Metal Analysis | | |
|---|---|---|---|---|---|---|
| | | | | % Mn | % Si | % C |
| 6,300 | 8.0V | 6 | 94.7 | 91.8 | 0.24 | 0.20 |

EXAMPLE NO. 3

Ore: Australian Ore; 52% Mn, typical
Solid Fuel: Pennsylvania Rice Coal
Ore:Fuel Ratio: 12:1
Grind: −60 mesh
Binder System: 2% (Bentonite/50% Molasses) solution
Table of Results: 73,039 pounds total

| Avg. Daily Feed, Lbs. | Avg. Cell Volt. | No of Days | % Mn Eff. | Metal Analysis | | |
|---|---|---|---|---|---|---|
| | | | | % Mn | % Si | % C |
| 6,640 | 8.1V | 11 | 90.1 | 91.3 | 0.27 | 0.21 |

Examples 1 and 2 compare the process of the present invention using coal, which contains residual volatile hydrocarbons, to coke. It will be seen that the overall manganese efficiency of the process in Example 1 using coal is higher than the efficiency of the process in Example 2 using coke. It is believed that coal is a more effective reducing agent since, when exposed to the intense heat of the molten electrolytic bath, the residual volatile hydrocarbons in coal generate hydrogen as well as carbon monoxide. The hydrogen present in the interior of the pelletized blend according to the present invention reacts with $Mn_2O_3$ to produce MnO and $H_2O$. When coke is used, as in Example 2, more carbon monoxide is required and the reducing effect of hydrogen is lost. Example 3 illustrates a loss in overall manganese efficiency when the ore:fuel ratio is increased from 10:1 to 12:1.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which the invention pertains.

What is claimed is:

1. A process for reducing manganese (IV) dioxide to manganese metal, comprising the steps of:
   blending a mixture containing manganese (IV) dioxide with sufficient carbonaceous fuel to reduce the manganese (IV) dioxide in the mixture to manganese (II) oxide,
   drying said blended mixture of manganese (IV) dioxide and carbonaceous fuel to remove free moisture,
   grinding said blended, dried mixture of manganese (IV) dioxide and carbonaceous fuel to a particle size between about −30 mesh to about −100 mesh,
   mixing said ground, blended, dried mixture with about 0.25% to about 4% by weight of a binder,
   agglomerating said ground, blended, dried, binder-containing mixture to form pellets,
   indurating said pellets by heating to a temperature between about 200° F. and about 350° F.,
   heating said pellets to reduce said manganese (IV) dioxide to manganese (II) oxide with said carbonaceous fuel,
   dissolving said manganese (II) oxide in a fused salt electrolytic bath,
   passing an electric current through said electrolytic bath containing dissolved manganese (II) oxide to reduce said manganese (II) oxide to manganese metal, and
   recovering said manganese metal.

2. The process for reducing manganese (IV) dioxide to manganese metal as set forth in claim 1 wherein said manganese (IV) dioxide is a pyrolusite manganese ore containing manganese (IV) dioxide.

3. The process for reducing manganese (IV) dioxide to manganese metal as set forth in claim 1 wherein said carbonaceous fuel is coke or coal.

4. The process for reducing manganese (IV) dioxide to manganese metal as set forth in claim 1 wherein said mixture of manganese (IV) dioxide and carbonaceous fuel contains from about 8 to about 18 parts by weight manganese (IV) dioxide for each part by weight of carbonaceous fuel.

5. The process for reducing manganese (IV) dioxide to manganese metal as set forth in claim 1 wherein said blended mixture of manganese (IV) dioxide and carbonaceous fuel are dried at a temperature of about 100° C.

6. The process for reducing manganese (IV) dioxide to manganese metal as set forth in claim 1 wherein said blended, dried mixture of manganese (IV) dioxide and carbonaceous fuel are ground to a particle size of about −60 mesh.

7. The process for reducing manganese (IV) dioxide to manganese metal as set forth in claim 1 wherein said ground, blended, dried mixture is mixed with about 1% to about 3% by weight of a binder.

8. The process for reducing manganese (IV) dioxide to manganese metal as set forth in claim 1 including mixing about 1% by weight of a liquid binder while agglomerating said ground, blended, dried, binder-containing mixture to facilitate agglomeration.

9. The process for reducing manganese (IV) dioxide to manganese metal as set forth in claim 1 wherein said pellets are heated to reduce said manganese (IV) dioxide to manganese (II) oxide in a fused salt electrolytic bath.

10. A process for reducing manganese (IV) dioxide to manganese metal, consisting of the steps of:

blending a mixture containing about 8 to about 18 parts by weight of manganese (IV) dioxide with each part by weight of coke or coal to reduce the manganese (IV) dioxide in the mixture to manganese (II) oxide, drying said blended mixture of manganese (IV) dioxide and coke or coal at about 100° C. to remove free moisture, grinding said blended, dried mixture of manganese (IV) dioxide and coke or coal to a particle size of about −60 mesh, mixing said ground, blended, dried mixture with about 1% to about 3% by weight of a binder, agglomerating said ground, blended, dried, binder-containing mixture to form pellets, indurating said pellets by heating to a temperature between about 200° F. and about 350° F., heating said pellets in a fused salt electrolytic bath to reduce said manganese (IV) dioxide to manganese (II) oxide with said coke or coal, dissolving said manganese (II) oxide in a fused salt electrolytic bath, passing an electric current through said electrolytic bath containing dissolved manganese (II) oxide to reduce said manganese (II) oxide to manganese metal, and recovering said manganese metal.

* * * * *